United States Patent [19]
Weeks et al.

[11] Patent Number: 4,474,323
[45] Date of Patent: Oct. 2, 1984

[54] CAPACITORS

[75] Inventors: Ronald D. Weeks, Brixham; David J. Croney, Paignton, both of England

[73] Assignee: International Standard Electric Corporation, New York, N.Y.

[21] Appl. No.: 429,571

[22] Filed: Sep. 30, 1982

Related U.S. Application Data

[62] Division of Ser. No. 160,524, Jun. 18, 1980.

[30] Foreign Application Priority Data

Jul. 3, 1979 [GB] United Kingdom ................ 7923112

[51] Int. Cl.³ ............................................ B23K 31/02
[52] U.S. Cl. .................................... 228/123; 228/208; 106/1.18; 106/1.19; 29/570; 361/433
[58] Field of Search ............... 228/122, 124, 208, 123; 106/1.18, 1.19; 29/570; 361/433

[56] References Cited

U.S. PATENT DOCUMENTS

| 3,581,159 | 5/1971 | Piper | 361/433 |
| 3,621,442 | 11/1971 | Racht et al. | 228/124 X |
| 3,789,274 | 1/1974 | Pfister et al. | 361/433 |
| 4,090,009 | 5/1978 | Horowitz | 106/1.19 X |

FOREIGN PATENT DOCUMENTS 134759 11/1978 Japan ................ 106/1.19

Primary Examiner—Nicholas P. Godici
Assistant Examiner—P. Weston Musselman, Jr.
Attorney, Agent, or Firm—John T. O'Halloran; Peter R. Ruzek; Mary C. Werner

[57] ABSTRACT

Connection to a tantalum capacitor electrode (17) is effected using a conductive paint layer (15), incorporating pure silver and pure copper particles, which minimizes silver leeching by a tincontaining solder alloy (18) by which the lead wire (17) is connected to the conductive paint layer (15), and thus minimizes power factor degradation.

5 Claims, 8 Drawing Figures

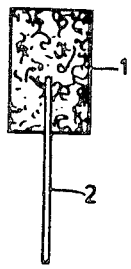
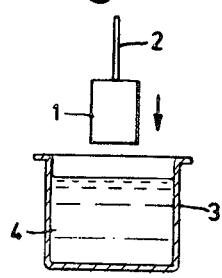
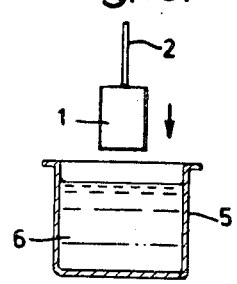
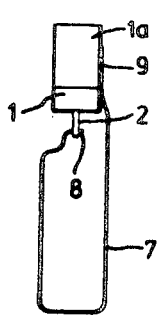
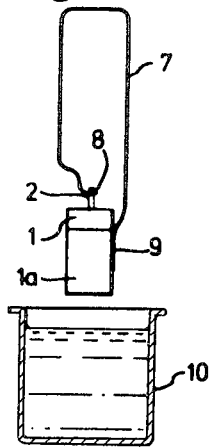
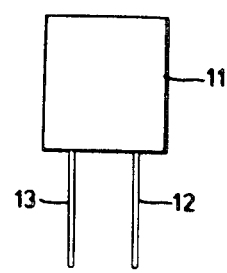
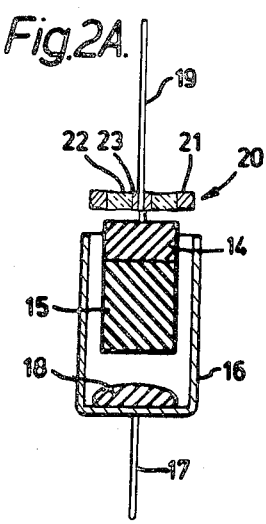
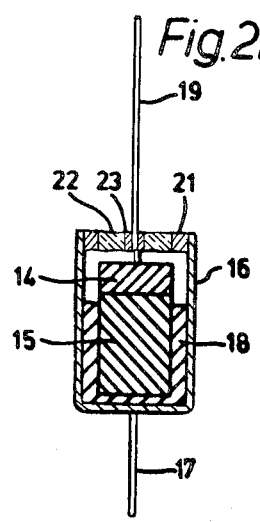

CAPACITORS

This is a division of application Ser. No. 160,524, filed June 18, 1980.

This invention relates to electrical components such as capacitors, particularly but not exclusively, solid electrolytic capacitors such as tantalum capacitors, and a conductive paint therefor.

Tantalum capacitors are conventionally manufactured with the cathode connection made by soldering a lead to a conductive silver paint applied to the outer surface of the body. It was found that with time power factor degradation occurs, this being due to diffusion of the silver into the tin-containing solder alloy used.

Whilst it is possible to lessen this "silver leeching" effect by providing a small amount of silver in the solder to start with, this adds to the cost of making the capacitor and is of limited success in overcoming the problem.

In our British Pat. No. 1,562,503 (R. D. Weeks—W. H. Bliss 1-1) is disclosed an alternative paint to the conventional silver paint. This alternative paint includes silver-coated copper particles as well as pure silver particles and was found to significantly limit power factor degradation, as well as being cheaper than a pure silver paint.

According to one aspect of the present invention there is provided an electrical component including an electrical connection between a tin-containing solder alloy and a conductive coating including silver and copper particles.

According to another aspect of the present invention there is provided a method of making an electrical component comprising coating a part of the component with a conductive paint containing silver and copper particles, causing the paint to dry and making electrical connection to the dried paint using a tin-containing solder alloy.

In order that the invention can be clearly understood reference will now be made to the accompanying drawings, in which:

FIG. 1 shows diagrammatically the process steps involved in making a solid tantalum capacitor according to an embodiment of the present invention, and FIG. 2 shows diagrammatically a second embodiment of the invention.

Firstly a specific conductive paint composition, according to yet another embodiment will be described, which has been found successful when applied to the manufacture of capacitors shown in FIGS. 1 and 2. The composition comprises 25.5% by weight silver powder, 25.5% copper powder, 6.9% polymeric binder, 42.0% by weight of a solvent compatible with the binder and 0.1% by weight of a wetting agent. The silver powder can be grade FS2 as supplied by Johnson-Matthey, which has a particle size medium of about 5 $\mu$m and a maximum of about 20 $\mu$m. The copper powder can be grade 3F as supplied by S. Fry & Co. Ltd., which has a particle size median of about 38 $\mu$m and a maximum of about 125 $\mu$m. The binder can be an acrylic copolymer sold under the trade name Surcol 530 by Allied Colloids Ltd. The solvent for this binder can be n-butyl acetate and the wetting agent can be triethanolamine.

The constituents are thoroughly mixed in a high speed rotary mixer to completely disperse the particles throughout the liquid.

The silver and copper particles are generally of lamellar form, that is to say flake-like, but a proportion of the particles may be of other form.

Successful paint compositions may employ powders and solvents etc. other than those specified above. In particular the polymeric binder may be an epoxide, methyl or ethyl cellulose, polyvinyl acetate, polyvinyl alcohol, a fluorinated rubber or acrylic copolymers including acrylamides and carboxylated acrylics. Some of these binders are water reducible, and it would be advantageous from a health and safety point of view to use a water-based system. The solvent must be compatible with the binder and have a suitable volatility to provide convenient drying characteristics. N-butyl acetate has been found to provide faster drying times than the 2-ethoxyethanol used in the specific formulations disclosed in British Pat. No. 1,562,503.

In addition, the proportions of the various constituents may be varied and still produce a successful paint. Limits for the constituents can be as follows (% by weight), silver powder 10 to 40, copper powder 50 to 10, polymeric binder 2 to 12, solvent 30 to 60 and wetting agent 0.01 to 1.0.

The silver paints disclosed in our British Pat. No. 1,562,503 typically contain a proportion of silver-coated copper particles together with pure silver particles, a polymeric binder and a solvent. The paints disclosed in the present Application contain pure copper particles in place of silver-coated copper particles, and at least part of the pure silver particles is replaced by pure copper particles. Such paints have been found to equally improve the performance of tantalum capacitors, by limiting power factor degradation, in comparison with the silver-coated copper particle containing paints, whilst being both cheaper to produce and avoiding the use of a difficult process necessary to silver coat copper particles.

Referring now to the drawings a tantalum capacitor body anode 1 is formed by compacting and sintering tantalum powder with a lead wire 2 forming the anode lead of the capacitor. A dielectric layer of tantalum pentoxide is formed i.e. grown electrolytically, on the surface of the tantalum particles. The interstices of the body are filled with manganese dioxide acting as a solid dielectric material. This stage is preferably carried out several times to ensure that the interstices of the sintered body are fully impregnated. The body is then dipped in a reservoir 3 of a semi-colloidal suspension of graphite in water 4 and oven-dried at around 100° C. for a ½ hour. The dipping is shown diagrammatically in FIG. 1B.

In FIG. 1C there is shown diagrammatically a reservoir 5 of conductive paint 6 made in accordance with the specific example given earlier. Care is taken to ensure that the conductive paint covers only a part 1a of the body 1 and does not encroach upon the anode lead wire 2 (See also FIG. 1D). The paint is air-dried preferably in an oven at around 100° C.

In FIG. 1D is shown a hairpin-shaped lead wire 7 which is connected to the anode lead wire 2 by a weld at 8 and the other end 9 of the hairpin wire embraces the coated portion 1a of the body 1.

Then the body 1 is fluxed (not shown) and dipped in a bath 10 of solder alloy containing tin and sometimes a small proportion of silver, so that the end 9 of the hairpin wire becomes soldered to the coated portion 1a of the body 1 (FIG. 1E). Other methods of coating are possible including spraying, brushing, screen-printing, offset printing.

Finally as shown in FIG. 1F the capacitor body 1 and portions of the lead wires are encapsulated in a resin or plastics coating 11 and the end of the hairpin wire is cut off to leave radial connection leads 12 and 13.

Referring now to FIG. 2 there is shown a tantalum capacitor body 14 which has been processed to the same stage as is shown in FIG. 1C above and has a coated portion 15. In this embodiment a can 16 is connected to a cathode lead wire 17 that is provided with a slug 18 of solder in the bottom of the can 16. Onto the anode lead wire 19 is assembled a seal 20 comprising an outer metal ring 21, an intermediate insulating glass ring 22 and a metal tubulation 23. The inside of the tubulation 23 and the outside of the ring 21 are tinned so that when the whole assembly is heated the solder slug 18 melts, soldering the coated portion 15 to the interior of the can 16. The ring 21 is soldered to the rim of the can and the tubulation 23 is soldered to the lead wire 19.

Thus the capacitor body 14 becomes sealed in the can 16 and the lead 17 is electrically connected with the coated portion 15 of the body 14. In this embodiment, as can be seen, the leads extend axially.

In both embodiments the copper particles are subject to less leeching than the silver particles. Whilst the silver particles could be completely leeched into the solder, the copper particles will maintain good electrical connection between the solder and the graphite coating of the anode. Under normal manufacturing conditions negligible oxidation of the copper particles has been found to occur.

We claim:
1. A method of making an electrical component comprising,
   forming a paint of conductive materials containing, by weight, 10 to 40% silver particles, 50 to 10% copper particles, 2 to 12% polymeric binder, 30 to 60% solvent, and 0.01 to 1% wetting agent;
   applying the paint to a part of the component;
   causing the paint to dry; and
   making an electrical connection to the dried paint using a tin-containing solder alloy.
2. The method as claimed in claim 1 wherein the applying step includes confining the paint in a receptacle and dipping the component in the paint.
3. The method as claimed in claim 1 further comprising, prior to making the electrical connection, forming radial connection leads by connecting one end of a hair-pin shaped lead wire to an anode lead wire and positioning the other end adjacent the paint-applied part.
4. The method as claimed in claim 1 wherein the step of making the electrical connection includes confining the solder alloy in a receptacle and dipping the component in the solder alloy to such an extent as to solder at least the other end of the lead wire to the coated part.
5. A paint composition for forming a conductive coating in an electrical component comprising, by weight, 10 to 40% silver particles, 50 to 10% copper particles, 2 to 12% polymeric binder, 30 to 60% solvent, and 0.01 to 1% wetting agent, both said silver particles and said copper particles substantially evenly dispersed therein.

* * * * *